Oct. 29, 1946.　　O. J. AUBERTIN　　2,410,331
FISHING ROD AND REEL
Filed Jan. 27, 1945　　3 Sheets-Sheet 1

Inventor
OVILA J. AUBERTIN
By W. Irwin Haskett
Attorney.

Inventor
OVILA J. AUBERTIN

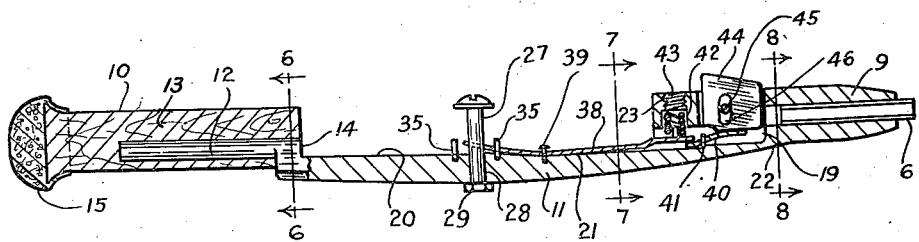

Patented Oct. 29, 1946

2,410,331

UNITED STATES PATENT OFFICE 2,410,331

FISHING ROD AND REEL

Ovila J. Aubertin, Matachewan, Ontario, Canada

Application January 27, 1945, Serial No. 574,874

5 Claims. (Cl. 43—20)

This invention relates to improvements in a fishing rod and reel and appertains particularly to one intended especially for deep water trolling and capable of handling up to as much as five hundred or a thousand feet of metallic line.

Among the objects of the invention are to provide an improved rod and reel that will indicate to the user the amount of line that has been paid out by the inclusion of a measuring gauge; has a coil spring interposed between and connecting the crank shaft and line spool to maintain tension on the line; indicates the approximate pounds pull on the line by a crank-carried pointer measuring against a graduated scale on the periphery of the line spool, being the rotative movement of the said spool relative to the crank against the action of the interposed connecting spring; allows the crank and spool to be freely connected through the coil spring only, or on warning ratchet, or locked together against any relative movement; has stream-lined, reel-incorporated handle part facilitating handling and operating with the inner and outer handle grips on rear and forward sides of the reel respectively and a padded, body-engaging part on the end of the rear grip; has the reel recessed in the handle part where it may be normally held against rotation by a slip brake whose release mechanism is located in the forward handle grip, facilitates level winding on the spool by carrying the line through a flattened, tubular-like passage in the underside of the forward hand grip and prevents possibility of slack line jumping the reel by the engagement of diametrically opposite leaf spring guards; and wherein the rod is preferably composed of separable half sections, and formed of tapered flat steel and provided with sheaf-carried pulleys for passing the line.

A still further object of the invention is the provision of a device of the nature and for the purpose described that is characterized by excellence of design, structural strength and simplicity; efficiency of operation, durability and ease of packing and that being capable of manufacture at a reasonable cost is thereby rendered commercially desirable.

To the accomplishment of these and related objects as shall become apparent as the description proceeds, the invention resides in the construction, combination and arrangement of parts as shall be hereinafter more fully described, illustrated in the accompanying drawings, and pointed out in the claims hereunto appended.

The invention will be best understood and can be more clearly described when reference is had to the drawings forming a part of this disclosure wherein like characters indicate like parts throughout the several views.

In the drawings—

Figure 5 is a horizontal section;

Figure 1:
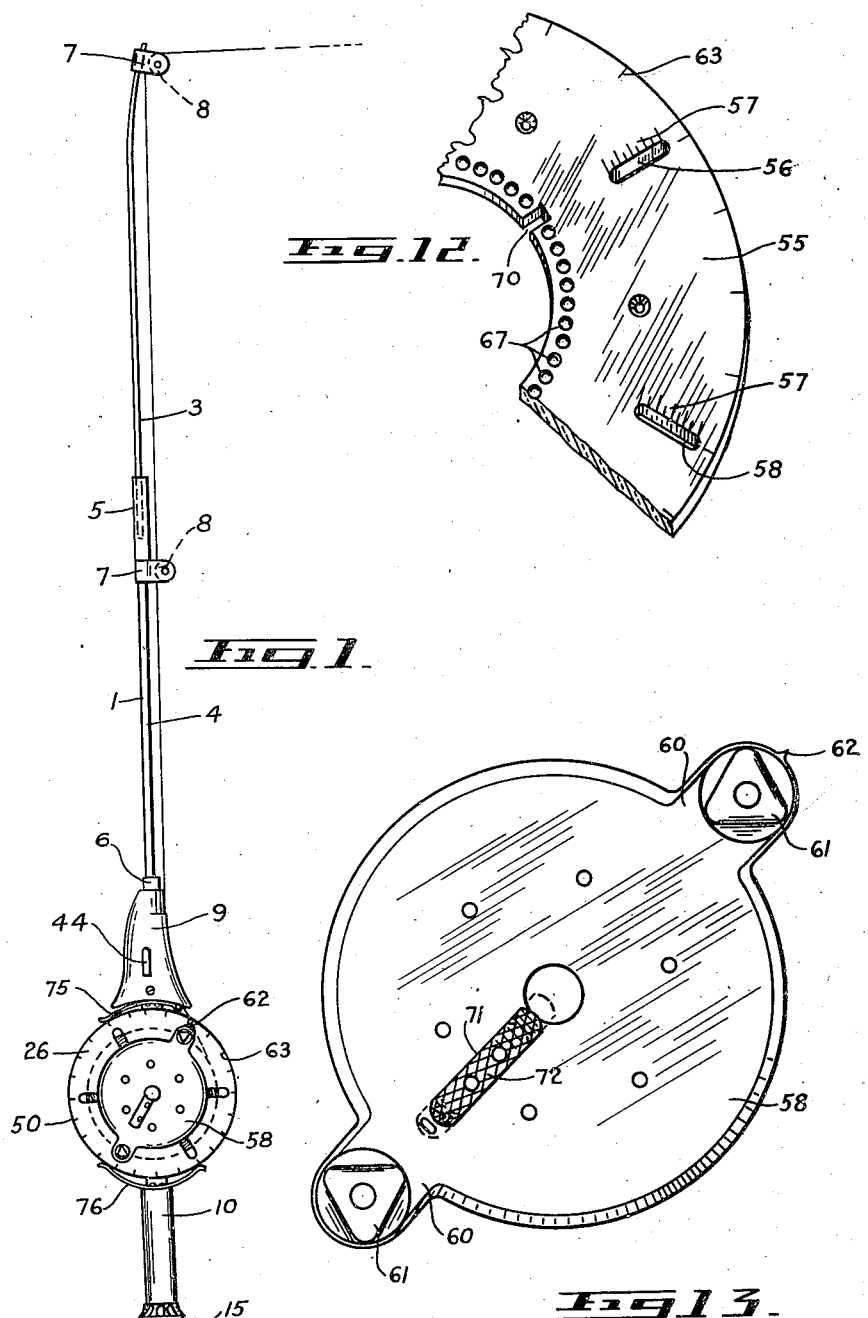
Figure 1 is an elevation of a preferred embodiment of my assembled rod and reel.
Figure 2:
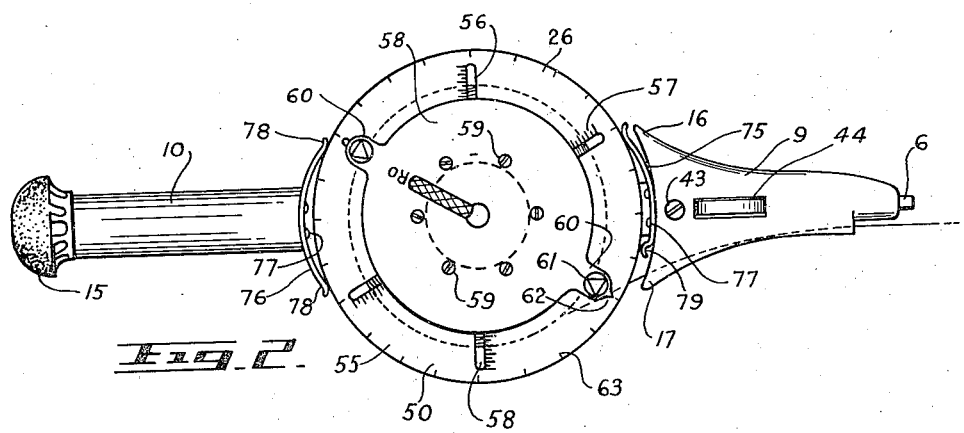
Figure 2 is an elevation of the combined handle part and reel.
Figure 3:
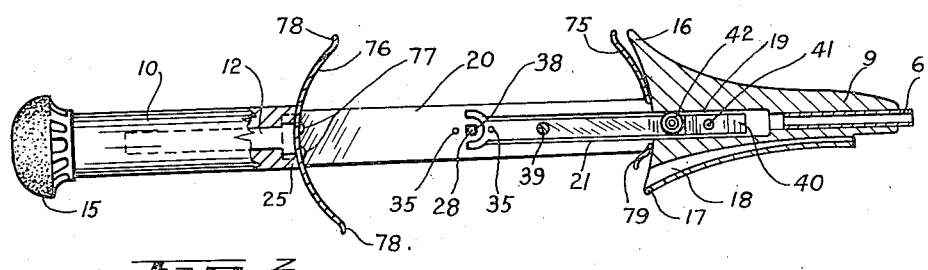
Figure 3 is a similar side elevation of the handle part alone, some portions being shown in vertical section.
Figure 4:
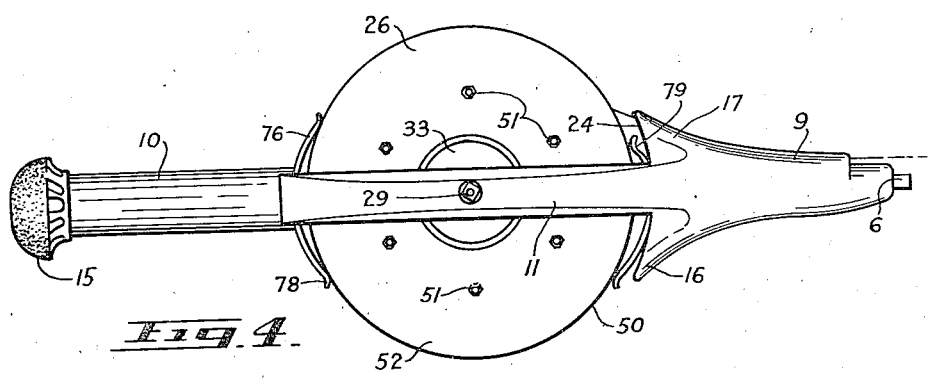
Figure 4 is another side elevation, being the reverse of Figure 2.

Figures 6, 7 and 8 are transverse sections as taken on lines 6—6, 7—7 and 8—8 respectively of Figure 5;

(Figures 2 to 8 inclusive being just twice the scale of Figure 1.)

Figure 9 is an enlarged, horizontal sectional elevation of the reel and contiguous parts of the handle;

Figure 10 is an end elevation of the sliding locking button;

Figure 11 is an elevation of the spring nest in the spool with the crank face plate removed;

Figure 12 is a perspective of but a segment of the near wall of the line spool; and Figure 13 is an elevation of the crank face plate.

(Figures 9 to 13 inclusive being twice the scale of 2 to 8.)

The preferred design of rod 1 for use with this present outfit is made of flat steel, tapering in both width and thickness toward the tip 2 where it is terminally curved slightly in the direction of the line pull, and is formed in two detachable sections 3 and 4 that fit tightly into sockets 5 and 6 on the outer end of the inner section and on the forward end of the combined handle part and reel support respectively. For passing the line, are a pair of channel or sheath-like brackets 7, one at the tip 2 and the other just below the socket 5, each carrying a small, pulley wheel 8.

The combined and possibly integrally formed handle part and reel support, the various features of which are shown clearly in Figures 2 to 9, inclusive, consists generally in a forward hand grip 9, in the front end of which the rod receiving socket 6 is formed, a rear hand grip 10 in substantial alignment therewith and a laterally offset intermediate section 11 in which the reel seats to operate in a common plane with the handle grips and rod. The balance thus achieved by this outfit is important, especially since the combined weight of rod and reel and 600 feet or more of copper line is considerable.

The rear hand grip 10 may consist entirely of a part of the combined handle part and reel support casting but for greater comfort to lighten the same and provide a better grip, I turn the end of the casting with its upper side 12, as seen in Figures 3, 5, 7 and 9, in line with the axis of the forward hand grip 9 and fit it into a round wooden shaft 13, coaxial with the forward hand grip 9 and rod 1, and recessed to receive a substantial part of the frame offset 14, and cover the butt-end with a sponge rubber pad 15.

The front hand grip 9, with the rod-receiving socket 6 extending in from its forward centre, is stream-lined in that it extends back from a rather small rounded nose to flare considerably on both upper and lower sides 16 and 17 to blend into the line described by the circumference of the reel though remaining of substantially constant thickness throughout, as will be noted in Figure 5. This increase in depth over thickness, especially as regards the flare on the upper side, imparts a greater stability to the rod by virtue of the improved wrist control. Under the socket 6, beginning a little behind the nose and continuing through to the rear of this front grip, is a wide slot or channel passage 18 through which the enclosed line passes to the reel, its width allowing the pointer finger of the user's left hand to reciprocate an incoming line to guide it as a level winder onto the reel.

Through the centre of the grip 9, from the rear of the socket 6, a passageway 19 reaches to the reel seat 20 formed by the offset 11 between the hand grips 9 and 10 and being slightly below the level of the seat 20 continues therealong as a central shallow trough 21, tapering up as it nears the mid point of the offset. An elongated rectangular opening 22 goes in to the passageway 19 from the near side of the grip and just to its rear a threaded bore 23 also communicates with the same passageway. This passageway 19 and the trough 21, opening 22 and bore 23 leading out therefrom are for the accommodation of the reel brake applying and releasing mechanism to which further reference will be made later.

In the seat 20 provided by the offset portion 11 of the handle part between the rear arcuate side 24 of the front grip 9 and the forward end 25 of the rear grip 10, a large composite reel 26 is set and secured in place by a nonrotatable axle bolt 27 extending in from its front and through a squared opening 28 in the offset 11 on the back of which it is engaged by a nut 29.

The reel has a central cranking hub or drum 30 journalled on the axle bolt 27. It has a concentric annular recess 31 on its rear that is faced with a friction lining 32 for engagement by a nonrotatable laterally-movable, circular brake disk 33 correspondingly provided with a friction surface 34. This friction surfaced brake disk 33 is held against rotation by a pair of pins 35 rising from the recessed frame 11 on diametrically opposite sides of the axle 27 and within the open centre 36 of the brake disk is a graphite bearing washer 37. Normally bearing against the back of the brake disk 33 is a yoked lever 38, held in the trough 21 in the reel seat 20 by a screw 39, perforated near its yoked end to pass the pin 35 and opened sufficient at its yoked end to lie around the bearing washer 37. The brake lever 38 teeters at the screw 39 in the arcuate bottom of the groove 21, its forward end extending into the passage 19, overlying a tip-up arm 40 centered against displacement by a pin 41 while a compressed coil spring 42 in the lower end of the bore 23 operates against it with varying pressure depending on the set of the confining screw 43 threaded in said bore. The brake disk 33 thus normally held in tight frictional engagement with the reel drum 30 is released by depressing a finger engaging button 44 that projects from the opening 22 in the forward handle grip 9 that is forced outwardly by the tip-up arm 40 bearing against its inner side. Limited movement is allowed this brake release button 44 by a transverse screw 45 extending through an elongated slot 46 therein.

Returning to the composite reel 26, the rotatable, normally brake-held cranking drum 30 has a concentric annular pocket 47 on its forward side while its outer rim 48 has a circumferential shoulder-forming seat 49 on either side. These seats receive and properly space the complementary halves of the line spool 50 that are secured together by the transverse bolts and nuts 51. The line spool remains free however to turn with respect to the cranking drum 30. The rear line spool half 52 includes a substantial lateral flange 53, concentric with the annular hub rim 48 yet spaced outwardly therefrom, whose outer side serves as the bottom of the trough of the line spool and whose inner side, confronting the hub rim 48 forms a nest for a coil ribbon spring 54 whose inner and outer ends connect respectively to the hub 30 and the line spool 50. In the front half 55 of the line spool a number of radially elongated slots 56 occur that extend outwards almost to the circumference from the flange 53, these enable the user to view the amount of line remaining on the spool 50 and having measuring graduations 57 along the edge, the length of line paid out is known.

Overlying the front half 55 of the line spools 50 is the crank plate 58 of substantially the same diameter as the outer side of the line spool flange 53. It connects securely to the crank hub 30 by a circular line of spaced nuts and bolts 59. Two diametrically opposite radial extensions 60 on this plate support rotatable triangular crank knobs 61; one of the extensions terminates in a pointer 62 for reading against a graduated weighing scale 63 marked on the peripherial edge of the line spool front plate 55.

Additional to the attachment of the cranking hub 30 to the line spool 50 by the coil ribbon spring 54 whereby the hub can have free rotatable movement with respect to the spool by a line pull operating on the latter equalizing a growing tension being built up in the winding of the spring, the hub and spool can be connected also in two other ways; i. e., (a) the spool may be on ratchet lock with respect to the hub or (b) they can be locked fast together against any relative rotative movement. To this end, I provide, in the annular pocket 47 of the cranking hub 30, on a segmental supporting block 64 a leaf spring 65 extending diametrically across the front of the hub, surrounding the axle bolt, and passing over the opposite edge of the hub beyond the shoulder forming seat 49, where an accommodating channel 66 is formed and overlying the inner rim of the front line spool half 55 that is there provided with a circumferential row of depressions or semicircular seats 67 into which a corresponding semicircular detent 68 on this free end of said leaf spring 65 is designed to ride as a ratchet. Finally, a slot 69 is cut across the face of the hub flange above the spring-supporting block 64 and a cooperating notch 70 is cut into the inner circumferential periphery of the front half 55 of the line spool at a point normally lying about 60° in a clock-wise direction from the slot 69 in the hub. For bridging this notch and slot a locking button 71 is carried by the cranking face plate 58, sliding in a radially disposed elongated slot 72 in registry with the slot 69. The outer, arced, thumb-engageable surface 72 is knurled and enlarged to spread beyond the slot while below the plate, a wing-like keeper 73 secures the button against displacement and therebelow is the bolt part proper 74 that is moveable by the sliding of the button in the slot 72 into three distinct positions viz., (1) it may be in ordinary, mid position marked "0" as seen in Figure 13 with its tail in the slot 69 but not otherwise operatively engaged, (2) it may be slipped forward into ratchet position, marked "R," where its head engages the upper side of the leaf spring 65 thereby depressing the detent 68 into riding the pocketed rim of the line spool, or (3) it may be retracted into locking position, marked "L," where its tail seats in the notch 70 in the line spool rim, to accomplish which latter it is necessary to turn the cranking hub with respect to the line spool, holding the same against the action of the coil ribbon 54, for some 60°.

To prevent any slack in a reeled-in line from jumping the walls of the line spool 50 and becoming snarled and snagged, arcuate leaf spring keepers 75 and 76 are applied laterally on the confronting ends 24 and 25 of the front and rear hand grips 9 and 10 that face the reel well. These spring keepers that exceed the width of the line spool are each attached approximately mid-way of their ends by two screws 77, their outer free ends 78 being bowed to have light frictional engagement with the circumferential edge of the spool. The depending end 79 of the forward keeper 75 is bent sharper and cut shorter to avoid interference with the line feeding through the slot or channel passage 18.

In use, the line is fed out without regard to the position of the control button, at least for a while, or it may be on warning ratchet position marked "R," from the first, with the operator holding the rod with both hands engaging the front and rear grips 9 and 10 in left and right hands respectively and holding the brake release button 44 down with the fingers of the left hand. When the desired length of line has been paid out by noting the remaining length of line seen through the slot 56 against the scale 57 and deducting this from the original reading, the brake button 44 is released and the crank hub 30 consequently brake-held, in which condition a line catching on bottom will not break but cause the spool to unwind with respect to the crank hub against the action of the spring, emitting the warning ratchet sound though eventually the brake will slip against its friction grip if the bait remains caught fast. Experience will soon teach the user to distinguish whether the bait be fouled or is just scraping bottom. If bottom had been scraped and the line partly reeled in to lessen its depth or comes free itself on clearing a shoal, any weeds, branches or other foreign matter holding on the hooks will show by the increase over normal of the pounds pull on the line which is determined by noting the position of the pointer 62 against the graduated scale 63.

When a fish is caught, with the reel on ordinary or ratchet but preferably the former; with the brake still engaging and one of the cranking knobs 61 firmly grasped in the left hand, the brake is released and the crank rotated clockwise. From its first strike, carrying the bait out just a little, the fish has held the line taut against the spring 54; now as the user reels, the line is kept under constant tension greatly increasing the chance of landing the catch and as it comes in, its weight and fight can be measured by the position of the pointer 62 against its scale.

The locking of the cranking drum 30 and reel 50 together, by moving the button 71 out to position marked "L," is a matter of choice but, for initially winding a line, reeling in a snagged branch or log or finally landing a long-played "big one" as well as for holding the line taut when not in use its use will appeal to many.

From the foregoing description taken in connection with the accompanying drawings, it will be manifest that a fishing rod and reel is provided that will fulfil all the necessary requirements of such a device, but as many changes could be made in the above description and many apparently widely different embodiments of the invention may be constructed within the scope of the appended claims, without departing from the spirit or scope thereof, it is intended that all matters contained in the said accompanying specification and drawings shall be interpreted as illustrative and not in a limitative or restrictive sense.

Having thus described my invention, what I claim as new and desire to secure by Letters Patent is:

1. For a fishing rod and reel, a reel-carrying handle part consisting of front and rear hand grips and an intermediate offset reel nest, a reel rotatable in said offset nest, arcuate leaf springs on the confronting ends of said hand grips engaging the periphery of said reel and a relatively wide channel passage through the underside of the front hand grip, leading to said reel; the lower end of the leaf spring on the front hand grip being shorter and with a sharper bend.

2. The combination with the construction set forth in claim 1 of a brake underlying and laterally engaging said reel, and brake release mechanism located in the side of said front hand grip and above said relatively wide channel passage.

3. A fishing reel for mounting on the handle part of a rod comprising, in combination with a rod, a rod supported spindle, a hub rotatable on said spindle, a brake normally engaging said hub, brake release mechanism in the handle part of said rod, a line spool rotatable on said hub, a coil ribbon spring nested concentrically between said hub and spool and connected by opposite ends thereto thus allowing a limited relative rotation of said hub and spool and a hub carried bolt movable into two positions in one of which it engages said spool to lock said hub and spool against relative rotative movement.

4. In a device as set forth in claim 3, ratchet mechanism between said hub and spool, said hub carried bolt being movable into a third position in engagement with said ratchet.

5. A fishing reel for mounting on the handle part of a rod comprising, in combination with a rod supported spindle, a hub rotatable on said spindle, a brake normally engaging said hub, brake release mechanism in the handle part of said rod, a line spool rotatable on said hub, a coil ribbon spring nested concentrically between said hub and spool and connected by opposite ends thereto thus allowing a limited relative rotation of said hub and spool, a normally inoperative ratchet mechanism between said hub and spool, a cranking plate attached to said hub and partially overlying said spool, a radially elongated slot in said plate and a button slidable therein and carrying a bolt on its underside for selectively engaging said ratchet mechanism and movable also to engage said spool to lock said hub and spool against relative rotative movement.

OVILA J. AUBERTIN.